AUTOMATIC GAIN CONTROL SYSTEM
Filed Aug. 6, 1954
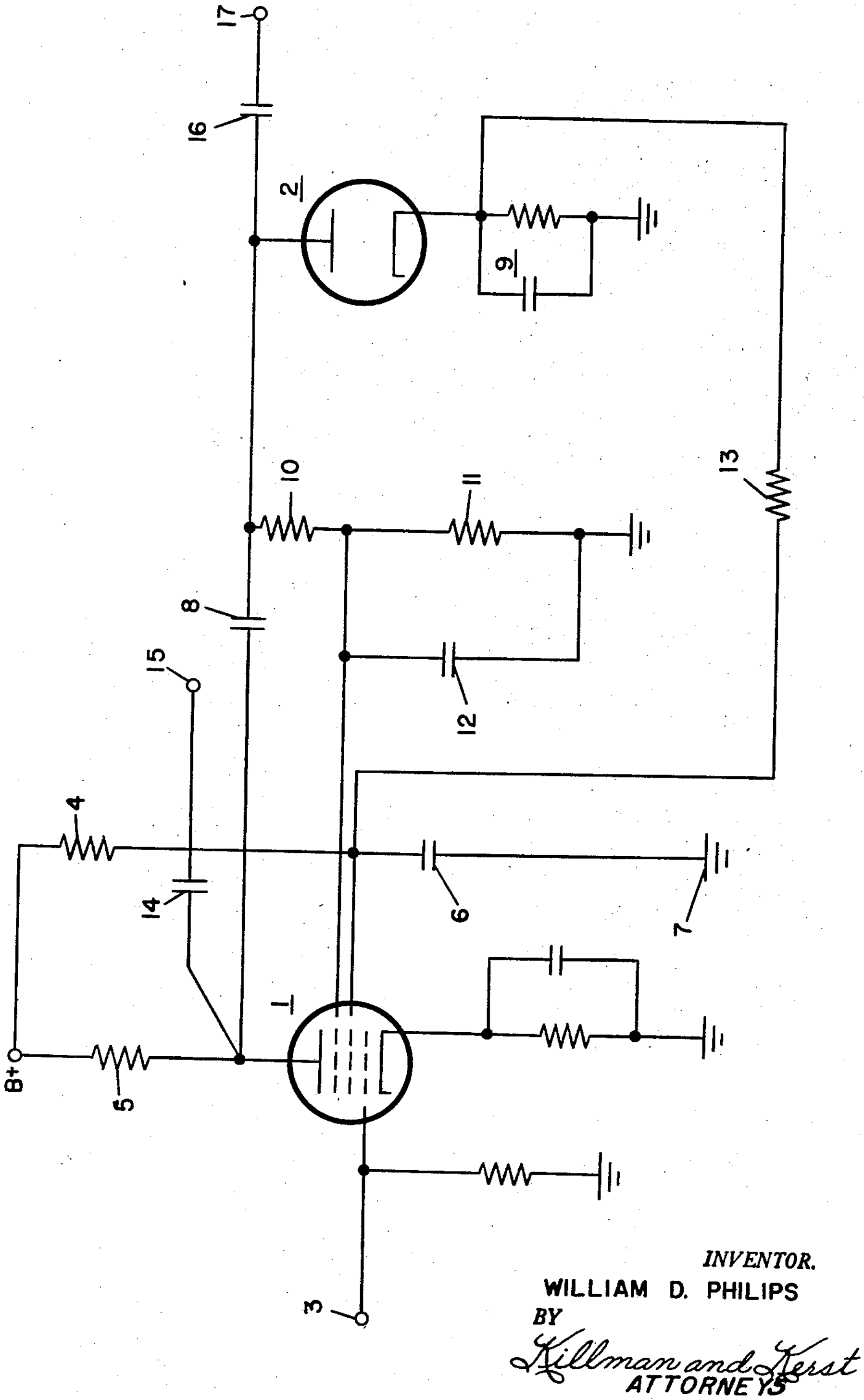
INVENTOR.
WILLIAM D. PHILIPS
BY
Killman and Kerst
ATTORNEYS United States Patent Office 2,857,481

Patented Oct. 21, 1958

2,857,481

AUTOMATIC GAIN CONTROL SYSTEM

William D. Philips, Baltimore, Md., assignor to Bendix Aviation Corporation, Towson, Md., a corporation of Delaware Application August 6, 1954, Serial No. 448,182

3 Claims. (Cl. 179—171)

This invention relates to control systems and in particular to automatic gain control systems.

The use of automatic gain control systems in the electronic industry is prevalent. Various types of equipment that are subjected to input signals whose variations may be excessive in amplitude employ these systems to maintain output signals below a predetermined level.

The present invention discloses a means for providing amplification and automatic gain control action with the "delay voltage" feature. An amplifier is provided for amplifying the input signal. The amplified signal is submitted to a variably biased rectifying circuit. The output of the rectifying circuit is utilized to control the gain of the aforementioned amplifier. The amplifier also provides a D. C. voltage which is a function of the plate current of the amplifier. This voltage is utilized to provide the variable bias for the rectifying circuit. Through this feedback arrangement, the bias on the rectifying circuit is decreased to provide more control voltage as the input signal is further increased above the predetermined level.

It is an object of this invention to provide a compact, inexpensive electronic system that contains means for amplification and automatic gain control.

Referring to the drawing, a schematic diagram of a circuit that embodies the invention is illustrated.

Referring in particular to the drawing, a pentode tube 1 and a diode tube 2 are employed in a circuit providing automatic gain control. An input terminal 3 is connected to the first grid of the tube 1. The second grid of this tube is connected to B+ through a resistor 4, and to a ground reference 7 through a capacitor 6. A resistor 5 connects the plate to B+. The plate of the tube 1 is connected to the plate of the tube 2 via a capacitor 8. The cathode of the tube 2 is connected to the ground reference 7 through a cathode bias means 9. A voltage divider comprising resistors 10 and 11 is connected from the plate of the tube 2 to the ground reference 7. The junction of the resistors 10 and 11 is connected to the third grid of the tube 1. A capacitor 12 shunts the resistor 11. A resistor 13 joins the second grid of the tube 1 to the cathode of the tube 2. A capacitor 14 connects the plate of the tube 1 to the output terminal 15.

The second grid of the tube 1 is connected to the B+ supply through the resistor 4. Because of the electron flow between the cathode and the second grid, a voltage will be developed across the resistor 4 such that the voltage between the second grid and the ground reference 7 will be the difference between the voltage of the B+ supply and the developed voltage. The effect of the second grid voltage is coupled to the cathode of tube 2 via the resistor 13. The second grid voltage determines the level at which rectification will occur in the tube 2. If the electron flow between the cathode and the plate of the tube 1 is partially restricted by the presence of a negative voltage on the third grid, the electron flow between the cathode and the second grid will increase and the second grid voltage will decrease. This will lower the bias on the tube 2.

To facilitate in the explanation of the operation of the circuit, assume a constant amplitude signal to be suddenly impressed on the first grid. The amplitude of this signal should be sufficient such that without AGC action, the amplitude of the signal on the plate of the tube 1 would be in excess of the desired maximum amplitude. The following transient condition will then occur: Rectification will occur in the tube 2 and a negative potential will be produced across the capacitor 12. This potential, which is coupled to the third grid of the tube 1, will reduce the gain of the stage and will cause the second grid voltage to decrease. Therefore, the signal coupled to the plate of the tube 2 will be reduced in amplitude but the bias on this tube will also be reduced. The net result of these two actions is to adjust the negative potential on the third grid so that the gain of the stage will remain reduced. The level at which the signal appearing on the plate of the tube 1 will stabilize will be slightly greater than the level of the signal that would be present just prior to the beginning of rectification by the tube 2. When the amplitude of the input signal changes, another transient will occur to adjust the gain of the amplifier such as to maintain the output signal below the predetermined level.

If a modulated signal is inserted on the control grid of the tube 1, the amplitude controlled demodulated signal appearing on the plate of the tube 2 may be obtained at a terminal 17 through a coupling capacitor 16.

What is claimed is:

1. An automatic gain control system comprising an electron tube having a plate, a cathode, a control grid, a screen grid and a suppressor grid, a power supply, means connecting the positive terminal of said power supply to said plate and said screen grid through respective resistors whereby space current flow through said tube divides between said plate and said screen grid, means applying signal voltage to said control grid, a rectifier having an anode and a cathode, means apply the output of said tube as it appears at said plate to the anode of said rectifier, means coupling the rectified voltage appearing at said anode of said rectifier to said suppressor grid whereby it controls the division of space current flow through said tube between said plate and said screen grid, and biasing means for said rectifier, said biasing means including means coupling the voltage appearing at said screen grid to said cathode of said rectifier.

2. An automatic gain control system comprising an electron tube having a plate, a cathode, a control grid, a screen grid and a suppressor grid, a power supply, means connecting the positive terminal of said power supply to said plate and said screen grid through respective resistors whereby space current flow through said tube divides between said plate and said screen grid, means applying signal voltage to said control grid, a rectifier having a pair of electrodes, means applying the output of said tube as it appears at said plate to one electrode of said rectifier, means coupling the rectified voltage appearing at said one electrode of said rectifier to said suppressor grid whereby it controls the division of space current flow through said tube between said plate and said screen grid, and biasing means for said rectifier, said biasing means including means coupling the voltage appearing at said screen grid to the remaining electrode of said rectifier.

3. An automatic gain control system comprising an electron tube having a plate, a cathode, a control grid, a screen grid and a suppressor grid, a power supply, means connecting the positive terminal of said power supply to said plate and said screen grid through respective resistors whereby space current flow through said tube divides between said plate and said screen grid, means applying signal voltage to said control grid, a rectifier having an anode and a cathode, means applying the output of said tube as it appears at said plate to the anode of said rectifier, means coupling the rectified voltage appearing at one electrode of said rectifier to said suppressor grid whereby it controls the division of space current flow through said tube between said plate and said screen grid, and biasing means for said rectifier, said biasing means including means coupling the voltage appearing at said screen grid to the remaining electrode of said rectifier.

References Cited in the file of this patent

UNITED STATES PATENTS

| | | |
|---|---|---|
| 2,199,080 | Norman | Apr. 30, 1940 |
| 2,303,357 | Hoover | Dec. 1, 1942 |
| 2,375,283 | Cloud | May 8, 1945 |

FOREIGN PATENTS

| | | |
|---|---|---|
| 109,335 | Australia | June 5, 1938 |